US012793376B2

(12) United States Patent
Wang et al.

(10) Patent No.: US 12,793,376 B2
(45) Date of Patent: Nov. 10, 2026

(54) SUBJECT MATERIAL DETERMINATION METHOD AND APPARATUS, AND ELECTRONIC DEVICE AND STORAGE MEDIUM

(71) Applicant: Lemon Inc., Grand Cayman (KY)

(72) Inventors: Guangwei Wang, Beijing (CN); Huilin Liu, Beijing (CN); Min Xie, Beijing (CN); Yiling Chen, Los Angeles, CA (US); Aixin Huo, Beijing (CN); Jie Liao, Los Angeles, CA (US); Yi Chen, Beijing (CN); Yongjie Zhang, Beijing (CN); Jiaxin Wang, Beijing (CN); Kexin Lin, Los Angeles, CA (US); Xiaodong Song, Beijing (CN)

(73) Assignee: Lemon Inc., Grand Cayman (KY)

( * ) Notice: Subject to any disclaimer, the term of this patent is extended or adjusted under 35 U.S.C. 154(b) by 114 days.

(21) Appl. No.: 18/840,061

(22) PCT Filed: Feb. 10, 2023

(86) PCT No.: PCT/SG2023/050071
§ 371 (c)(1),
(2) Date: Aug. 20, 2024

(87) PCT Pub. No.: WO2023/158374
PCT Pub. Date: Aug. 24, 2023

(65) Prior Publication Data

US 2025/0157180 A1 May 15, 2025

(30) Foreign Application Priority Data

Feb. 21, 2022 (CN) ......................... 202210158265.9

(51) Int. Cl.
*G06V 10/26* (2022.01)
*G06T 11/60* (2026.01)
(Continued)

(52) U.S. Cl.
CPC .............. *G06V 10/26* (2022.01); *G06T 11/60* (2013.01); *G06V 10/141* (2022.01); *G06V 10/56* (2022.01); *G06V 10/60* (2022.01)

(58) Field of Classification Search
CPC ........ G06T 11/60; G06V 10/26; G06V 10/56; G06V 10/141; G06V 10/25; G06V 10/60; Y02P 90/30
(Continued)

(56) References Cited

U.S. PATENT DOCUMENTS

2005/0190990 A1 9/2005 Burt et al.
2018/0202903 A1* 7/2018 Chou ............... G01N 35/00871
(Continued)

FOREIGN PATENT DOCUMENTS

CN 106331663 A 1/2017
CN 109472655 A * 3/2019 ............. G06T 11/10
(Continued)

OTHER PUBLICATIONS

Deschaintre V, Aittala M, Durand F, Drettakis G, Bousseau A. Single-image svbrdf capture with a rendering-aware deep network. ACM Transactions on Graphics (ToG). Jul. 30, 2018;37(4):1-5.*
(Continued)

*Primary Examiner* — Phu K Nguyen
(74) *Attorney, Agent, or Firm* — BakerHostetler

(57) ABSTRACT

A subject material determination method, an apparatus, an electronic device, and a storage medium. The method includes: acquiring a first image to be processed and a second image to be processed which include a subject to be recognized and under a same visual angle, in which the first image to be processed is determined in response to a flash lamp being turned on; determining a highlight center point of the first image to be processed, and determining material information to be fused according to the highlight center
(Continued)

point and the first image to be processed; determining color information according to the second image to be processed; and determining target material information of the subject to be recognized according to the material information to be fused and the color information.

20 Claims, 2 Drawing Sheets

(51) Int. Cl.

| | |
|---|---|
| ***G06V 10/141*** | (2022.01) |
| ***G06V 10/56*** | (2022.01) |
| ***G06V 10/60*** | (2022.01) |

(58) Field of Classification Search
USPC .......................................................... 345/418
See application file for complete search history.

(56) References Cited

U.S. PATENT DOCUMENTS

2018/0246089 A1* 8/2018 Chou ............... G01N 33/54366
2020/0307174 A1* 10/2020 Woytowitz ........... B29C 64/393

FOREIGN PATENT DOCUMENTS

| | | | | | |
|---|---|---|---|---|---|
| CN | 109583385 | A | | 4/2019 | |
| CN | 110853128 | A | | 2/2020 | |
| CN | 110929651 | A | | 3/2020 | |
| CN | 111080595 | A | | 4/2020 | |
| CN | 112634156 | A | * | 4/2021 | ....... G06F 18/23213 |
| CN | 113065521 | A | | 7/2021 | |
| GB | 202117372 | | | 1/2022 | |
| JP | 2006-140945 | A | | 6/2006 | |
| JP | 2014-199644 | A | | 10/2014 | |
| JP | 2015211357 | A | * | 11/2015 | |
| JP | 2018105792 | A | * | 7/2018 | |

OTHER PUBLICATIONS

China Patent Application No. 202210158265.9; Notice of Registration; dated Sep. 29, 2025; 8 pages.
International Patent Application No. PCT/SG2023/050071; Int'l Search Report; dated Oct. 12, 2023; 3 pages.
China Patent Application No. 202210158265.9; Office Action; dated Mar. 12, 2025; 15 pages.
Zhang Rui; "Comparison and Research of Two Key Technologies Based on Maya Materials"; Journal of Jilin Radio and Television University; Issue 8; 2017; p. 134-135 (contains English Translation).

* cited by examiner

SUBJECT MATERIAL DETERMINATION METHOD AND APPARATUS, AND ELECTRONIC DEVICE AND STORAGE MEDIUM

CROSS-REFERENCE TO RELATED APPLICATION

This application is a national filing of International Patent Application No. PCT/SG2023/050071, filed on Feb. 10, 2023, which claims the priority to and benefits of Chinese Patent Application No. 202210158265.9, filed on Feb. 21, 2022. All the aforementioned patent applications are hereby incorporated by reference in their entireties.

TECHNICAL FIELD

The present disclosure relates to the field of computer technology, and, for example, to a subject material determination method, an apparatus, an electronic device, and a storage medium.

BACKGROUND

As the demand for computer-based rendering of materials continues to increase, material acquisition techniques, based on which large amounts of data relating to a material can be processed and analyzed to acquire material parameters for that material, become increasingly important.

However, in practical applications, the process of determining the material information of some materials is very cumbersome, and since some materials have more complicated colors or characteristics, such as cosmetics, paints used for decoration, etc., the material information cannot be accurately acquired based on the relevant methods. Therefore, the effect of rendering the material based on the material information is poor, and the visual effect presented by the material cannot be accurately presented to the user.

SUMMARY

The present disclosure provides a subject material determination method, an apparatus, an electronic device, and a storage medium, which can conveniently determine the material information of a specific subject through only two images, and improves the efficiency of determining the material information.

In a first aspect, the present disclosure provides a subject material determination method, and the method includes:

acquiring a first image to be processed and a second image to be processed which include a subject to be recognized and under a same visual angle, in which the first image to be processed is determined in response to a flash lamp being turned on;

determining a highlight center point of the first image to be processed, and determining material information to be fused according to the highlight center point and the first image to be processed;

determining color information according to the second image to be processed; and determining target material information of the subject to be recognized according to the material information to be fused and the color information.

In a second aspect, the present disclosure further provides a subject material determination apparatus, and the apparatus includes: an image-to-be-processed acquisition module, a material-information-to-be-fused determination module, a color information determination module and a target material information determination module;

the image-to-be-processed acquisition module is configured to acquire a first image to be processed and a second image to be processed which include a subject to be recognized and under a same visual angle, in which the first image to be processed is determined in response to a flash lamp being turned on;

the material-information-to-be-fused determination module is configured to determine a highlight center point of the first image to be processed, and determine material information to be fused according to the highlight center point and the first image to be processed;

the color information determination module is configured to determine color information according to the second image to be processed; and the target material information determination module is configured to determine target material information of the subject to be recognized according to the material information to be fused and the color information.

In a third aspect, the present disclosure further provides an electronic device, and the electronic device includes:

one or more processors; and a storage apparatus is configured to store one or more programs, in which when the at least one program is executed by the at least one processor, the at least one processor implements the above-described subject material determination method.

In a fourth aspect, the present disclosure further provides a storage medium, which includes computer-executable instructions, in which the computer-executable instructions, when executed by a computer processor, implements the above-mentioned subject material determination method.

In a fifth aspect, the present disclosure also provides a computer program product, which includes a computer program carried on a non-transitory computer readable medium, and the computer program is used to implement the above-mentioned subject material determination method.

DETAILED DESCRIPTION

Figure 1:
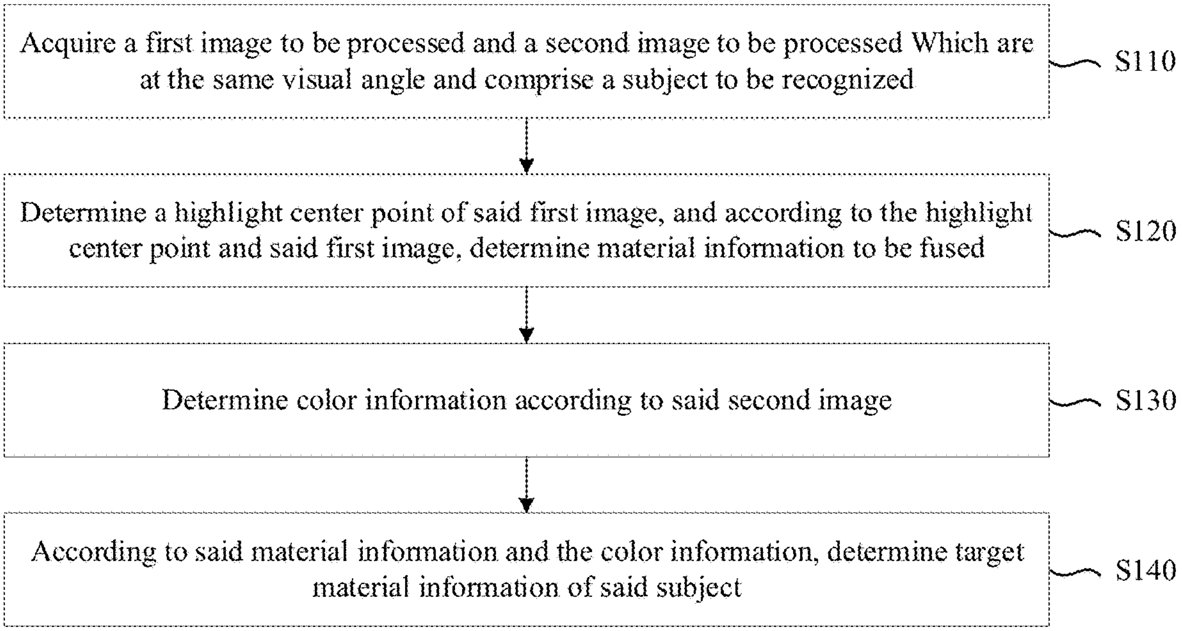
FIG. 1 is a flow diagram of a subject material determination method provided in a first embodiment of the present disclosure.

Embodiments of the present disclosure will be described below with reference to the accompanying drawings. While some embodiments of the present disclosure are shown in the drawings, the present disclosure may be embodied in many forms, with these embodiments are provided to provide an understanding of the present disclosure. The figures and examples of the present disclosure are for illustrative purposes only.

Various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

Concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and those skilled in the art should understand that unless otherwise stated in the context, it should be understood as "one or more".

Before introducing the present technical solution, the application scenario of the embodiments of the present disclosure may be exemplarily described first. For example, in a pre-developed beauty makeup application, the user may be provided with a function of trying out some cosmetic in a virtual scenario based on the scheme of the present embodiment. When the user wants to try out a lipstick in the virtual scenario, the user clicks on a trial control corresponding to the lipstick, and then the application may invoke the material information, which is determined based on the embodiment and corresponding to the lipstick, and then render the lipstick on the lip part of the face image of the user according to the material information, thereby simulating the visual effect of applying the lipstick to the user, while also allowing the user to learn the texture and color of the lipstick.

Alternatively, in house decoration related applications, the user may be provided with the function of performing simulated trials of some decoration paints based on the solution of the present embodiment. When the user wishes to understand the effect of applying a paint to a wall of a house, the user may click on the trial control corresponding to the paint, and then the application may invoke the material information corresponding to the paint determined according to the embodiment, and render the paint on the wall portion of a house image according to the material information, thereby simulating the visual effect of the house after the paint is applied thereon.

In addition to various scenarios such as cosmetic trial and house decoration simulation, the scheme of the embodiments of the present disclosure can be applied to scenarios such as 3-Dimension (3D) cloud rendering and virtual shopping, any scenario where it is necessary to determine material information of a specific material and render the material based on the material information to accurately present its visual effect to a user.

First Embodiment

FIG. 1 is a flow diagram of a subject material determination method provided in the first embodiment of the present disclosure, the present embodiment may be applicable to determining material information corresponding to a subject in a simple manner, and the method may be performed by a subject material determination apparatus, the apparatus may be implemented in software and/or hardware, which may be an electronic device such as a mobile terminal, a Personal Computer (PC) terminal, a server, and the like. The scenario of effect video presentation is usually implemented by the cooperation of a client and a server, and the method provided by the present embodiment may be executed by the service, the client, or the cooperation of the client and the service.

As shown in FIG. 1, the method of the present embodiment includes:

S110, acquiring a first image to be processed and a second image to be processed which include a subject to be recognized and under a same visual angle.

The subject to be recognized may be a material with specific physical characteristics and capable of displaying a color, for example, a chemical mixture of the cosmetic, the paint used for decoration, and the like. Unlike common materials, there is no material information of the subject to be recognized in the computer and thus cannot be rendered directly, for a conventional steel plate, the corresponding material information can be invoked directly in an associated image processing software to render and render the steel plate, but for a lipstick formed of a plurality of components and displaying a distinctive color, there is no corresponding material information stored in an associated application software and thus cannot be reproduced in a display interface. The subject to be recognized may be one or more, in the present embodiment, only one subject to be recognized is taken as an example for explanation, it should be understood by those skilled in the art that when there is a plurality of subjects to be recognized, the material information of each subject to be recognized may be determined based on the scheme of the present embodiment.

Therefore, in the present embodiment, in order to acquire the material information of the subject to be recognized, it is first necessary to acquire two images of the subject to be recognized under the same visual angle, i.e., the first image to be processed and the second image to be processed, in which the first image to be processed is determined when the flash lamp is turned on. In the two images, there is a difference in brightness of environment in which the subject to be recognized is located. In the process of acquiring two images, a camera apparatus may be deployed at a fixed position, and a lens is aligned with the subject to be recognized, the flash lamp is turned on to illuminate the subject to be recognized and photographed, thereby acquiring the first image to be processed, and the flash lamp may be turned off to photograph the subject to be recognized, thereby acquiring the second image to be processed.

In this embodiment, when the subject to be recognized is the chemical mixture such as the cosmetic or the paint, due to specific physical characteristics of the subject to be recognized, in the process of photographing the subject to be recognized to acquire the two images, the subject to be recognized further needs to be coated on a specific object in order to make the material information ultimately acquired more accurate. In an actual application process, when a material determination control is detected to have been triggered, activating the flash lamp and photographing the first image to be processed of the subject to be recognized being coated onto a target sphere; and when the flash lamp is turned off, photographing the second image to be processed of the subject to be recognized being coated onto the target sphere.

The target sphere may be a solid model of a sphere, and when the subject to be recognized, such as the cosmetic or the paint, is coated on the target sphere, a continuous solid film on surface of the target sphere that is firmly adhered and has a certain strength, i.e., a coating is formed on the surface of the sphere. The material determination control is a control developed in advance in the relevant application software for determining material information of the subject to be recognized, for example, when a user click on a material information determination button in the application software is detected, the computer may issue a turn-on instruction to the flash lamp device, and photograph the target sphere that is coated with the subject to be recognized, and after acquiring the first image to be processed, issue a turn-off instruction to the flash lamp device, and photograph the target sphere again to acquire the second image to be processed. The first image to be processed and the second image to be processed are photographed based on the same visual angle.

S120, determining a highlight center point of the first image to be processed, and determining material information to be fused according to the highlight center point and the first image to be processed.

In this embodiment, the first image to be processed is used to determine the material information of the subject to be recognized, for example, when the subject to be recognized is a lipstick, and the corresponding first image to be processed is acquired, the material information to be fused of the lipstick is acquired by processing the first image to be processed. For the subject to be recognized, the material information to be fused is a material parameter to be fused, the parameter includes, but is not limited to, various visual properties, such as texture, smoothness, transparency, reflectivity, refractive index, and luminosity etc.

Meanwhile, since the first image to be processed is photographed with the flash lamp is turned on, before determining the material information to be fused of the subject to be recognized, the highlight portion in the first image to be processed needs to be determined first, and when the subject to be recognized is coated on the target sphere, the highlight portion is the portion of the target sphere that directly reflects the light source, and is the brightest portion of the presented visual effect. The brightest point in the highlight portion is the highlight center point.

Dividing the first image to be processed into at least one to-be-processed sub-region based on a preset region size; determining a brightness value corresponding to each to-be-processed sub-region, and taking a to-be-processed sub-region with a highest brightness value as a target sub-region; taking a center point of the target sub-region as the highlight center point.

The to-be-processed sub-region is a partial region divided from the image, the preset region size characterizes the size of the to-be-processed sub-region. In order to determine the highlight portion in the first image to be processed, the first to-be-processed region may be divided into at least one to-be-processed sub-region according to the preset region adjustment size by taking a pixel point as a region adjustment step.

Exemplarily, after acquiring a specific resolution of the first image to be processed, a fixed-size box for dividing the image may be generated, and the first image to be processed may be divided from a leftmost side based on the box, and the acquired region is the first to-be-processed sub-region; when the region adjustment step is a pixel point, then the box is moved to right by a position of one pixel point, and the image is divided based on a region where the box is currently located to acquire the second to-be-processed sub-region, and so on, when the box is moved to a rightmost side of the first image to be processed, all the to-be-processed sub-regions corresponding to the image can be divided. It should be understood by those skilled in the art that, in the actual application process, the preset region size and the region adjustment step may be set according to requirements, and the embodiments of the present disclosure are not limited herein.

After acquiring each to-be-processed sub-region corresponding to the first image to be processed, in order to determine the highlight center point of the image, it is further necessary to determine the to-be-processed sub-region with the highest brightness among the plurality of to-be-processed sub-regions. A weight value corresponding to each pixel point in each to-be-processed sub-region is determined based on a Poisson distribution; a region brightness value of each to-be-processed sub-region is determined based on the weight value and a pixel brightness value corresponding to each pixel point; and the to-be-processed sub-region corresponding to a highest region brightness value is taken as the target sub-region.

The Poisson distribution, as a discrete probability distribution, is suitable for describing the number of times a random event occurs per unit time. In this embodiment, the Poisson distribution may be used to determine the weight value occupied by each pixel point in each to-be-processed sub-region, and then since the first image to be processed has the attribute of the brightness value, there is also exists a corresponding brightness value for each pixel point in the to-be-processed sub-region. After determining the weight value and the brightness value of each pixel point in the to-be-processed sub-region, the region brightness value of the region to which the pixel points belong can be calculated; and when the region brightness value is high, it indicates that there exists a portion with high brightness in the to-be-processed sub-region; and when the region brightness value is low, it indicates that there does not exists a portion with high brightness in the to-be-processed sub-region. Finally, the to-be-processed sub-region with highest region brightness value is the target sub-region includes the highlight center point.

Exemplarily, when a first image to be processed of the target sphere that is coated with a lipstick is acquired, and the first image to be processed is divided to acquire ten to-be-processed sub-regions, a weight value and a brightness value of each pixel point in each region can be determined based on the Poisson distribution, so as to calculate a region brightness value of each region; and after comparing the brightness values of the ten regions, the region with the highest brightness value can be selected as the target sub-region, and the highlight center point of the target sphere that is coated with the lipstick exists in the target sub-region.

In this embodiment, after the target sub-region is determined, the center point of the target sub-region is taken as the highlight center point, i.e., the pixel point with the highest brightness value in the first image to be processed is acquired. For example, when the determined target sub-region is a square, the highlight center point is the pixel point corresponding to the diagonal intersection of the square; and when the determined target sub-region is a circle, the highlight center point is the pixel point corresponding to the center of the circle. It should be understood by those skilled in the art that the target sub-region may be a variety of regular or irregular shapes, and the center point of the region may also be determined based on a corresponding calculation formula, and the embodiments of the present disclosure are not repeated herein.

In this embodiment, after the highlight center point is determined in the first image to be processed, the material parameter to be fused corresponding to the object to be recognized can be determined. A target normal map of the first image to be processed is determined; and the target normal map and information of the highlight center point is processed based on a pre-trained parameter generation model to acquire the material parameter to be fused.

The target normal map may be a normal map, i.e., a normal is made at each point of a concave and convex surface of an original object, the direction of the normal is marked by a Red-Green-Blue (RGB) color channel, another different surface that is not parallel to the original concave and convex surface. In the process of practical application, by determining the target normal map of the first image to be processed, it is possible to make a surface with a low degree of detail present an accurate illumination direction and reflection effect with a high degree of detail, for example, a model with a high degree of detail is baked out of a normal map by mapping and then stuck on a normal map channel of a low-poly model in time, and it is also possible to make a surface with a rendering effect of a light shade distribution, and the use of the normal map reduces a region and a calculation content required in the process of rendering an object, realizing optimization of the rendering effect.

In this embodiment, the parameter generation model is a model based on a deep learning algorithm for determining the material parameter to be fused of the subject to be recognized, and the input is the target normal map and information of the highlight center point, and the output is the corresponding material parameter to be fused. Exemplarily, when the first image to be processed of the target sphere that is coated with a lipstick is acquired, and the target normal map and information of the highlight center point of the first image to be processed is acquired, the above two kinds of data may be processed based on the parameter generation model to acquire values of various visual attributes, such as texture, smoothness, transparency, reflectivity, refractive index, and luminosity of the lipstick etc., After acquiring the material parameters to be fused for the subject to be recognized, the information can be stored in a specific database, so as to invoke in the subsequent process of determining the target material information thereof and image rendering, avoiding the waste of computational resources caused by determining the material parameters to be fused for multiple times.

S130, determining color information according to the second image to be processed.

In the present embodiment, the second image to be processed is acquired by photographing the object to be recognized without the flash lamp, and the color of the object to be recognized can be accurately reflected in the absence of a highlight portion in the second image to be processed, and the second image to be processed is used at least for determining color information of the object to be recognized, for example, determining the color actually presented by the lipstick as the subject to be recognized.

In the present embodiment, in order to improve the accuracy of the determined color information of the object to be recognized, the color information of the subject to be recognized may be determined according to the RGB value of the pixel point of the subject to be recognized in the second image to be processed. The second image to be processed may be loaded into the relevant image processing software first, and the object in the second image to be processed may be recognized based on a built-in function of the software or a pre-written program code, and when the subject to be recognized is determined, the RGB value of each pixel point corresponding to the subject to be recognized may be read, so as to acquire the color information of the subject to be recognized. The color information acquired in this manner is a set of RGB values of a plurality of pixel points.

Exemplarily, when the second image to be processed of the target sphere that is coated with lipstick is acquired, the second image to be processed may be imported into the relevant image processing software, and when the software recognizes the target sphere based on the built-in function, the RGB value of each pixel point corresponding to the target sphere may be determined, so as to acquire the color information of the lipstick, i.e., to determine the color of the lipstick as presented in the second image to be processed.

S140, determining target material information of the subject to be recognized according to the material information to be fused and the color information.

The target material information is a plurality of visual properties of the subject to be recognized, and not only includes attribute values such as texture, smoothness, transparency, reflectivity, refractive index, and luminosity etc., but also includes color information corresponding to the subject to be recognized. Since the material information to be fused and the color information of the subject to be recognized is determined separately from the two images in a decoupled manner, in order to acquire the target material information of the subject to be recognized, it is further necessary to fuse the above two types of information determined.

Exemplarily, when the material information to be fused and the RGB values of the lipstick are acquired based on the first image to be processed and the second image to be processed of the target sphere that is coated with the lipstick, respectively; the two kinds of information may be integrated to acquire the target material information of the lipstick, and the parameters of the related image processing software may be set or adjusted according to the target material information, and the lipstick may be rendered and displayed in the display interface.

In the present embodiment, when the target material information of the subject to be recognized is determined, an object corresponding to the subject to be recognized may also be displayed on the target display interface, and the object corresponding to the subject to be recognized may be taken as the to-be-tried object.

The object corresponding to the subject to be recognized is an object carrying a material, for example, a lipstick or a can of paint, etc., and the target display interface is an associated application interface, for example, an interface associated with a beauty makeup related Augmented Reality (AR) application, an AR shopping application, an AR house decoration application, and a 3D cloud rendering application.

When the object is displayed in the target display interface, a 3D model or a corresponding image of the object may be displayed, so that the object is used as the object to be tried in the virtual scenario constructed by the computer. When a user's triggering operation on an image or 3D model of the object to be tried is detected, the trial of the object can be realized. The following is an example of the beauty makeup scenario to illustrate the process after triggering the object to be tried.

In this embodiment, when an instruction of object trial is detected, a face image corresponding to a target audience is acquired, and the target material information corresponding to a triggered target trial object is retrieved; target rendered material information is determined based on the face image and the target material information; and add a target effect to the face image based on the target rendered material information to acquire a target effect image.

Exemplarily, when the object to be tried is a lipstick, the corresponding 3D model of the lipstick is displayed in a lipstick product list of a beauty makeup AR application, and when a user's click or touch operation on the lipstick is detected, the instruction of object trial is acquired, indicating that the user needs to try out the lipstick in the virtual scenario.

In order to display the visual effect presented after applying the lipstick in the application display interface, it is further necessary to select a specific image or model as the basis for applying the lipstick. After the instruction of object trial is detected, it is further necessary to acquire a face image of the user, so that the face image is used as a basis for applying the lipstick.

When an instruction of object trial is detected, the application may invoke a camera of a mobile device to capture the face image of the user, or direct the user to actively upload the face image in a particular manner. Meanwhile, in the process of acquiring the user's face image, the target material information corresponding to the lipstick also needs to be invoked, so as to determine the target rendered material information. The target rendered material information is information acquired after processing a part of the face image corresponding to the object to be tried, for example, an image acquired after rendering a lip part of the face image of the user based on the target material information corresponding to the lipstick.

In this embodiment, after acquiring the target rendered material information based on the face image and the target material information, and the target rendered material information may be superimposed onto the face image to acquire the target effect image, and when the object to be tried is the lipstick in the above-described example, the target effect image can present the visual effect of applying lipstick to the lips of the user.

Compared with the conventional way of multiple roundtrip debugging between material production and effect construction, the present embodiment, when acquiring a user's face image, directly invokes the target material information to render the corresponding parts in the image, realizing the visual preview of the beauty makeup effect, and not only reduces the threshold and cost of generating the effect, but also enhances the convenience of applying the effects to related scenes such as beauty makeup, cloud rendering, and AR shopping.

In the process of determining the target rendered material information, to-be-used light brightness may also be determined based on the face image; and the target material information is adjusted based on the to-be-used light brightness to acquire the target rendered material information.

The to-be-used light brightness may be brightness corresponding to the face image. In this embodiment, in order to make a final acquired target effect image more natural, it is also necessary to adjust the target material information according to the to-be-used light brightness. Adapting the light brightness value of a subject to be used to the brightness value of the face image, and making a more natural and realistic visual effect in the target effect image as a whole after rendering.

After the target material information is adjusted according to the to-be-used light brightness and processed in combination with a specific part of the face image, the target rendered material information can be acquired. Exemplarily, the face image uploaded by the user is dark, and when the brightness value of the face image is determined, the target material information of the lipstick may be adjusted based on the brightness value, and the lip parts in the face image may be processed based on the adjusted target material information, so as to acquire the corresponding target rendered material information. In the final picture constructed based on the target rendered material information, the lipstick may also present a darker shade, so that the simulation acquires a more natural and realistic face image after applying the lipstick.

It should be understood by those skilled in the art that, in the actual application process, adjustment can also be made to each parameter in the target material information in a manual manner, thereby realizing visualization parameter adjustment to the subject to be recognized, enhancing the flexibility of applying the scheme of the present embodiment in the above-mentioned multiple scenarios.

The technical solution of the present embodiment, acquiring the first image to be processed and the second image to be processed which include a subject to be recognized and under the same visual angle, that is, acquiring images of the subject to be recognized when the flash lamp is turned on or turned off, respectively; determining the highlight center point of the first image to be processed, and determining the material information to be fused according to the highlight center point and the first image to be processed; determining the color information according to the second image to be processed; and determining the target material information of the subject to be recognized according to the material information to be fused and the color information; the material information of the specific subject can be conveniently determined by only two images, thereby improving the efficiency of determining the material information, moreover, the material information to be fused and the color information are determined separately in a decoupled manner, and the target material information is constructed based on the two kinds of information, thereby improving the accuracy of the resulting material information, thereby making the rendered picture more effective, and facilitating the accurate display of the visual effects presented by the subject to be recognized to the user.

Second Embodiment

Figure 2:
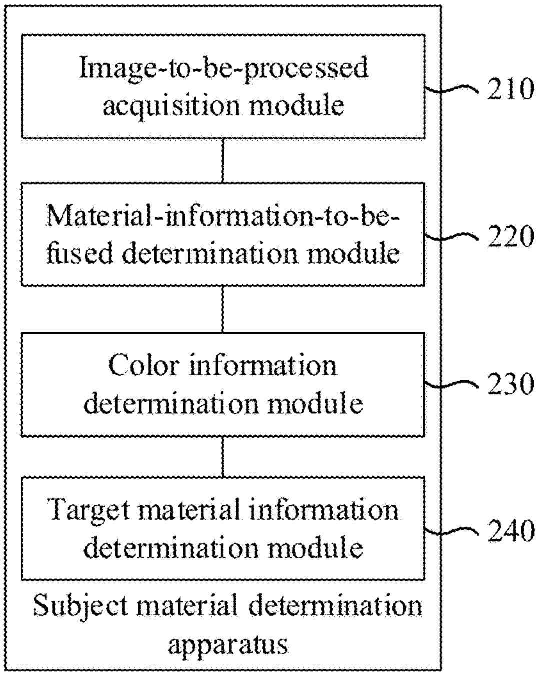
FIG. 2 is a structural block diagram of a subject material determination apparatus provided in a second embodiment of the present disclosure.

FIG. 2 is a structural block diagram of a subject material determination apparatus provided in the second embodiment of the present disclosure, which can perform the subject material determination method according to any embodiment of the present disclosure, and includes functional modules and effects corresponding to the performing method. As shown in FIG. 2, the apparatus includes an image-to-be-processed acquisition module 210, a material-information-to-be-fused determination module 220, a color information determination module 230 and a target material information determination module 240.

The image-to-be-processed acquisition module 210 is configured to acquire a first image to be processed and a second image to be processed which include a subject to be recognized and under a same visual angle, in which the first image to be processed is determined in response to a flash lamp being turned on.

The material-information-to-be-fused determination module 220 is configured to determine a highlight center point of the first image to be processed, and determine material information to be fused according to the highlight center point and the first image to be processed.

The color information determination module 230 is configured to determine color information according to the second image to be processed.

The target material information determination module 240 is configured to determine target material information of the subject to be recognized according to the material information to be fused and the color information.

On the basis of the above technical solution, the image-to-be-processed acquisition module 210 includes a first image to be processed determination unit and a second image to be processed determination unit.

The first image to be processed determination unit is configured to, when a material determination control is detected to have been triggered, activate the flash lamp and photograph the first image to be processed of the subject to be recognized being coated onto a target sphere.

The second image to be processed determination unit is configured to, when the flash lamp is turned off, photograph the second image to be processed of the subject to be recognized being coated onto the target sphere.

On the basis of the above technical solution, the first image to be processed and the second image to be processed are photographed based on the same visual angle.

On the basis of the above technical solution, the material-information-to-be-fused determination module 220 includes a sub-region-to-be-processed division unit, a target sub-region determination unit, and a highlight center point determination unit.

The sub-region-to-be-processed division unit is configured to divide the first image to be processed into at least one to-be-processed sub-region based on a preset region size.

The target sub-region determination unit is configured to determine a brightness value corresponding to each to-be-processed sub-region, and take the to-be-processed sub-region with a highest brightness value as the target sub-region.

The highlight center point determination unit is configured to take a center point of the target sub-region as the highlight center point.

The sub-region-to-be-processed division unit is further configured to divide the first to-be-processed region into at least one to-be-processed sub-region according to the preset region adjustment size by taking a pixel point as a region adjustment step.

The target sub-region determination unit is further configured to determine a weight value corresponding to each pixel point in each to-be-processed sub-region based on a Poisson distribution; determine a region brightness value of each to-be-processed sub-region based on the weight value and a pixel brightness value corresponding to each pixel point; and take the to-be-processed sub-region corresponding to a highest region brightness value as the target sub-region.

On the basis of the above technical solution, the material-information-to-be-fused determination module 220 further includes a target normal map determination unit and a material parameter to be fused determination unit.

The target normal map determination unit is configured to determine a target normal map of the first image to be processed.

The material parameter to be fused determination unit is configured to process the target normal map and information of the highlight center point based on a pre-trained parameter generation model to acquire a material parameter to be fused.

The color information determination module 230 is further configured to determine the color information of the subject to be recognized according to a RGB value of a pixel point of the subject to be recognized in the second image to be processed.

On the basis of the above technical solution, the subject material determination apparatus further includes a display module and a target effect image determination module.

The display module is configured to display an object corresponding to the subject to be recognized on a target display interface, and take the object corresponding to the subject to be recognized as an object to be tried.

The target effect image determination module is configured to acquire a face image corresponding to a target audience and retrieve the target material information corresponding to a triggered target trial object, when an instruction of object trial is detected; determine target rendered material information based on the face image and the target material information; add a target effect to the face image based on the target rendered material information to acquire a target effect image.

The target effect image determination module is further configured to determine to-be-used light brightness based on the face image; adjust the target material information according to the to-be-used light brightness to acquire the target rendered material information.

The technical solution provided by the embodiment, acquiring the first image to be processed and the second image to be processed which include the subject to be recognized and under the same visual angle, that is, acquiring images of the subject to be recognized when the flash lamp is turned on or turned off, respectively; determining the highlight center point of the first image to be processed, and determining the material information to be fused according to the highlight center point and the first image to be processed; determining the color information according to the second image to be processed; and determining the target material information of the subject to be recognized according to the material information to be fused and the color information; the material information of the specific subject can be conveniently determined by only two images, thereby improving the efficiency of determining the material information, moreover, the material information to be fused and the color information are determined separately in a decoupled manner, and the target material information is constructed based on the two kinds of information, thereby improving the accuracy of the resulting material information, thereby making the rendered picture more effective, and facilitating the accurate display of the visual effects presented by the subject to be recognized to the user.

The subject material determination apparatus provided by the embodiment of the present disclosure may execute the subject material determination method provided by any of the embodiments of the present disclosure, and may have functional modules and effects corresponding to the execution method.

A plurality of units and modules included in the above apparatus are divided only according to functional logic, but are not limited to the above division as long as corresponding functions can be realized; in addition, the names of the plurality of functional units are also merely for convenience of distinguishing from each other, and are not used to limit the protection scope of the embodiments of the present disclosure.

Third Embodiment

Figure 3:
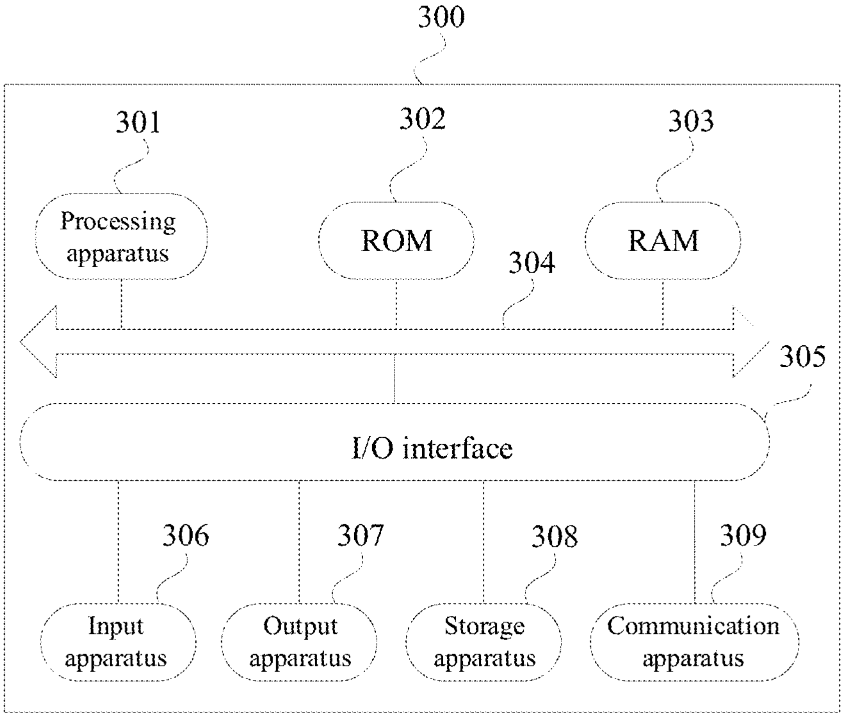
FIG. 3 is a structural schematic diagram of an electronic device provided in a third embodiment of the present disclosure.

FIG. 3 is a structural schematic diagram of an electronic device provided in the third embodiment of the present disclosure. Referring to FIG. 3, FIG. 3 illustrates a schematic structural diagram of an electronic device 300 (For example, the terminal device or server in FIG. 3) suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 3 is merely an example, and should not pose any limitation to the functions and the range of use of the embodiments of the present disclosure.

As illustrated in FIG. 3, the electronic device 300 may include a processing apparatus 301 (e.g., a central processing unit, a graphics processing unit, etc.), which can perform various suitable actions and processing according to a program stored in a read-only memory (ROM) 302 or a program loaded from a storage apparatus 308 into a random-access memory (RAM) 303. The RAM 303 further stores various programs and data required for operations of the electronic device 300. The processing apparatus 301, the ROM 302, and the RAM 303 are interconnected by means of a bus 304. An input/output (I/O) interface 305 is also connected to the bus 304.

Usually, the following apparatus may be connected to the I/O interface 305: an input apparatus 306 including, for example, a touch screen, a touch pad, a keyboard, a mouse, a camera, a microphone, an accelerometer, a gyroscope, or the like; an output apparatus 307 including, for example, a liquid crystal display (LCD), a loudspeaker, a vibrator, or the like; a storage apparatus 308 including, for example, a magnetic tape, a hard disk, or the like; and a communication apparatus 309. The communication apparatus 309 may allow the electronic device 300 to be in wireless or wired communication with other devices to exchange data. While FIG. 3 illustrates the electronic device 300 having various apparatuses, it should be understood that not all of the illustrated apparatuses are necessarily implemented or included. More or fewer apparatuses may be implemented or included alternatively.

According to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 309 and installed, or may be installed from the storage apparatus 308, or may be installed from the ROM 302. When the computer program is executed by the processing apparatus 301, the above-mentioned functions defined in the methods of some embodiments of the present disclosure are performed.

The names of messages or information interacted between the plurality of apparatus in the embodiments of the present disclosure are used for illustrative purposes only and are not intended to limit the scope of such messages or information.

The electronic device provided in the embodiment of the present disclosure belongs to the same concept as the subject material determination method provided in the above embodiment, technical details that are not elaborately described in the present embodiment may be referred to the above embodiment, and the present embodiment has the same effect as the above embodiment.

The Fourth Embodiment

An embodiment of the present disclosure provides a computer storage medium, the computer storage medium stores a computer program, when the computer program executed by a processor, implements the subject material determination method provided by the above embodiment.

The above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

acquire a first image to be processed and a second image to be processed which include a subject to be recognized and under a same visual angle, in which the first image to be processed is determined in response to a flash lamp being turned on; determine a highlight center point of the first image to be processed, and determining material information to be fused according to the highlight center point and the first image to be processed; determine color information according to the second image to be processed; and determine target material information of the subject to be recognized according to the material information to be fused and the color information.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, [Example 1] provides a subject material determination method, and the method includes:

acquiring a first image to be processed and a second image to be processed which include a subject to be recognized and under a same visual angle, in which the first image to be processed is determined in response to a flash lamp being turned on;

determining a highlight center point of the first image to be processed, and determining material information to be fused according to the highlight center point and the first image to be processed;

determining color information according to the second image to be processed; and determining target material information of the subject to be recognized according to the material information to be fused and the color information.

According to one or more embodiments of the present disclosure, [Example 2] provides a subject material determination method, and the method further includes:

when a material determination control is detected to have been triggered, activating the flash lamp and photographing the first image to be processed of the subject to be recognized being coated onto a target sphere;

when the flash lamp is turned off, photographing the second image to be processed of the subject to be recognized being coated onto the target sphere; and the first image to be processed and the second image to be processed are photographed based on the same visual angle.

According to one or more embodiments of the present disclosure, [Example 3] provides a subject material determination method, and the method further includes:

dividing the first image to be processed into at least one to-be-processed sub-region based on a preset region size;

determining a brightness value corresponding to each to-be-processed sub-region, and taking a to-be-processed sub-region with a highest brightness value as a target sub-region; and taking a center point of the target sub-region as the highlight center point.

According to one or more embodiments of the present disclosure, [Example 4] provides a subject material determination method, and the method further includes:

dividing a first to-be-processed region into the at least one to-be-processed sub-region according to the preset region adjustment size by taking a pixel point as a region adjustment step.

According to one or more embodiments of the present disclosure, [Example 5] provides a subject material determination method, and the method further includes:

determining a weight value corresponding to each pixel point in each to-be-processed sub-region based on a Poisson distribution;

determining a region brightness value of each to-be-processed sub-region based on the weight value and a pixel brightness value corresponding to each pixel point; and taking a to-be-processed sub-region corresponding to a highest region brightness value as the target sub-region.

According to one or more embodiments of the present disclosure, [Example 6] provides a subject material determination method, and the method further includes:

determining a target normal map of the first image to be processed; and processing the target normal map and information of the highlight center point based on a pre-trained parameter generation model to acquire a material parameter to be fused.

According to one or more embodiments of the present disclosure, [Example 7] provides a subject material determination method, and the method further includes:

determining the color information of the subject to be recognized according to a Red-Green-Blue (RGB) value of a pixel point of the subject to be recognized in the second image to be processed.

According to one or more embodiments of the present disclosure, [Example 8] provides a subject material determination method, and the method further includes:

displaying an object corresponding to the subject to be recognized on a target display interface, and taking the object corresponding to the subject to be recognized as an object to be tried.

According to one or more embodiments of the present disclosure, [Example 9] provides a subject material determination method, and the method further includes:

acquiring a face image corresponding to a target audience and retrieving the target material information corresponding to a triggered target trial object, when an instruction of object trial is detected;

determining target rendered material information based on the face image and the target material information; and adding a target effect to the face image based on the target rendered material information to acquire a target effect image.

According to one or more embodiments of the present disclosure, [Example 10] provides a subject material determination method, and the method further includes:

determining to-be-used light brightness based on the face image; and adjusting the target material information according to the to-be-used light brightness to acquire the target rendered material information.

According to one or more embodiments of the present disclosure, [Example 11] provides a subject material determination apparatus, and the apparatus further includes: an image-to-be-processed acquisition module, a material-information-to-be-fused determination module, a color information determination module and a target material information determination module;

the image-to-be-processed acquisition module is configured to acquire a first image to be processed and a second image to be processed which include a subject to be recognized under a same visual angle, in which the first image to be processed is determined in response to a flash lamp being turned on;

the material-information-to-be-fused determination module is configured to determine a highlight center point of the first image to be processed, and determine material information to be fused according to the highlight center point and the first image to be processed;

the color information determination module is configured to determine color information according to the second image to be processed; and the target material information determination module is configured to determine target material information of the subject to be recognized according to the material information to be fused and the color information.

Furthermore, while a plurality of operations are depicted in a particular order, this should not be construed as requiring that the operations be performed in the particular order shown or in a sequential order of execution. Multitasking and parallel processing may be advantageous in certain environments. Similarly, while multiple implementation details are included in the above discussion, these should not be construed as limiting the scope of the present disclosure. Some of the features described in the context of separate embodiments may also be implemented in combination in a single embodiment. Conversely, a plurality of features described in the context of a single embodiment may also be implemented in multiple embodiments, either individually or in any suitable sub-combination.

The invention claimed is:

1. A subject material determination method, comprising:

acquiring a first image to be processed and a second image to be processed which each comprise a subject to be recognized under a same visual angle, wherein the first image to be processed is determined in response to a flash lamp being turned on, and wherein the second image to be processed is determined when the flash lamp is turned off;

determining a highlight center point of the first image to be processed, wherein the highlight center point is a point in the first image to be processed having the highest brightness value;

determining first material information to be fused according to the highlight center point and the first image to be processed;

determining color information according to the second image to be processed; and determining second material information of the subject to be recognized according to the first material information to be fused and the color information.

2. The method according to claim 1, wherein the acquiring the first image to be processed and the second image to be processed comprises:

when a material determination control is detected to have been triggered, activating the flash lamp and photographing the first image to be processed of the subject to be recognized being coated onto a sphere; and when the flash lamp is turned off, photographing the second image to be processed of the subject to be recognized being coated onto the sphere, wherein the first image to be processed and the second image to be processed are photographed based on the same visual angle.

3. The method according to claim 1, wherein the determining a highlight center point of the first image to be processed, comprises:

dividing the first image to be processed into at least one to-be-processed sub-region based on a preset region size;

determining a brightness value corresponding to each to-be-processed sub-region, and taking a to-be-processed sub-region with a highest brightness value as a sub-region; and taking a center point of the sub-region as the highlight center point.

4. The method according to claim 3, wherein the dividing the first image to be processed into at least one to-be-processed sub-region based on a preset region size, comprises:

dividing a first to-be-processed region into the at least one to-be-processed sub-region according to the preset region adjustment size by taking a pixel point as a region adjustment step.

5. The method according to claim 3, wherein the determining a brightness value corresponding to each to-be-processed sub-region, and taking a to-be-processed sub-region with a highest brightness value as a sub-region, comprises:

determining a weight value corresponding to each pixel point in each to-be-processed sub-region based on a Poisson distribution;

determining a region brightness value of each to-be-processed sub-region based on the weight value and a pixel brightness value corresponding to each pixel point; and taking a to-be-processed sub-region corresponding to a highest region brightness value as the target-sub-region.

6. The method according to claim 1, wherein the determining the first material information to be fused according to the highlight center point and the first image to be processed, comprises:

determining a normal map of the first image to be processed; and processing the normal map and information of the highlight center point based on a pre-trained parameter generation model to acquire a material parameter to be fused.

7. The method according to claim 1, wherein the determining color information according to the second image to be processed, comprises:

determining the color information of the subject to be recognized according to a Red-Green-Blue (RGB) value of a pixel point of the subject to be recognized in the second image to be processed.

8. The method according to claim 1, further comprising:

displaying an object corresponding to the subject to be recognized on a display interface, and taking the object corresponding to the subject to be recognized as an object to be tried.

9. The method according to claim 8, further comprising:

acquiring a face image corresponding to an audience and retrieving the second material information corresponding to a triggered trial object, when an instruction of object trial is detected;

determining rendered material information based on the face image and the second material information; and adding an effect to the face image based on the rendered material information to acquire an effect image.

10. The method according to claim 9, wherein the determining rendered material information based on the face image and the second material information, comprises:

determining to-be-used light brightness based on the face image; and adjusting the second material information according to the to-be-used light brightness to acquire the rendered material information.

11. An electronic device, comprising:

at least one processor; and a storage apparatus, configured to store at least one program, wherein when the at least one program is executed by the at least one processor, the at least one processor implements a subject material determination method, which comprises:

acquiring a first image to be processed and a second image to be processed which each comprise a subject to be recognized under a same visual angle, wherein the first image to be processed is determined in response to a flash lamp being turned on, and wherein the second image to be processed is determined when the flash lamp is turned off;

determining a highlight center point of the first image to be processed, wherein the highlight center point is a point in the first image to be processed having the highest brightness value;

determining first material information to be fused according to the highlight center point and the first image to be processed;

determining color information according to the second image to be processed; and determining second material information of the subject to be recognized according to the first material information to be fused and the color information.

12. The electronic device according to claim 11, wherein the acquiring the first image to be processed and the second image to be processed, comprises:

when a material determination control is detected to have been triggered, activating the flash lamp and photographing the first image to be processed of the subject to be recognized being coated onto a sphere; and when the flash lamp is turned off, photographing the second image to be processed of the subject to be recognized being coated onto the sphere, wherein the first image to be processed and the second image to be processed are photographed based on the same visual angle.

13. The electronic device according to claim 11, wherein the determining a highlight center point of the first image to be processed, comprises:

dividing the first image to be processed into at least one to-be-processed sub-region based on a preset region size;

determining a brightness value corresponding to each to-be-processed sub-region, and taking a to-be-processed sub-region with a highest brightness value as a sub-region; and taking a center point of the sub-region as the highlight center point.

14. The electronic device according to claim 13, wherein the dividing the first image to be processed into at least one to-be-processed sub-region based on a preset region size, comprises:

dividing a first to-be-processed region into the at least one to-be-processed sub-region according to the preset region adjustment size by taking a pixel point as a region adjustment step.

15. The electronic device according to claim 13, wherein the determining a brightness value corresponding to each to-be-processed sub-region, and taking a to-be-processed sub-region with a highest brightness value as a sub-region, comprises:

determining a weight value corresponding to each pixel point in each to-be-processed sub-region based on a Poisson distribution;

determining a region brightness value of each to-be-processed sub-region based on the weight value and a pixel brightness value corresponding to each pixel point; and taking a to-be-processed sub-region corresponding to a highest region brightness value as the sub-region.

16. The electronic device according to claim 11, wherein the determining the first material information to be fused according to the highlight center point and the first image to be processed, comprises:

determining a normal map of the first image to be processed; and processing the normal map and information of the highlight center point based on a pre-trained parameter generation model to acquire a material parameter to be fused.

17. The electronic device according to claim 11, further comprising:

displaying an object corresponding to the subject to be recognized on a display interface, and taking the object corresponding to the subject to be recognized as an object to be tried.

18. The electronic device according to claim 17, further comprising:

acquiring a face image corresponding to an audience and retrieving the second material information corresponding to a triggered trial object, when an instruction of object trial is detected;

determining rendered material information based on the face image and the second material information; and adding an effect to the face image based on the rendered material information to acquire an effect image.

19. The electronic device according to claim 18, wherein the determining rendered material information based on the face image and the second material information, comprises:

determining to-be-used light brightness based on the face image; and adjusting the second material information according to the to-be-used light brightness to acquire the rendered material information.

20. A non-transitory storage medium comprising computer-executable instructions, wherein the computer-executable instructions, when executed by a computer processor, implements a subject material determination method as claimed, which comprises:

acquiring a first image to be processed and a second image to be processed which each comprise a subject to be recognized under a same visual angle, wherein the first image to be processed is determined in response to a flash lamp being turned on, and wherein the second image to be processed is determined when the flash lamp is turned off;

determining a highlight center point of the first image to be processed, wherein the highlight center point is a point in the first image to be processed having the highest brightness value;

determining first material information to be fused according to the highlight center point and the first image to be processed;

determining color information according to the second image to be processed; and determining second material information of the subject to be recognized according to the first material information to be fused and the color information.

* * * * *